Jan. 24, 1956    C. C. AVERILL    2,732,475
HEATING ELEMENT UNIT FOR OVENS AND THE LIKE
Filed Oct. 8, 1951    2 Sheets-Sheet 1
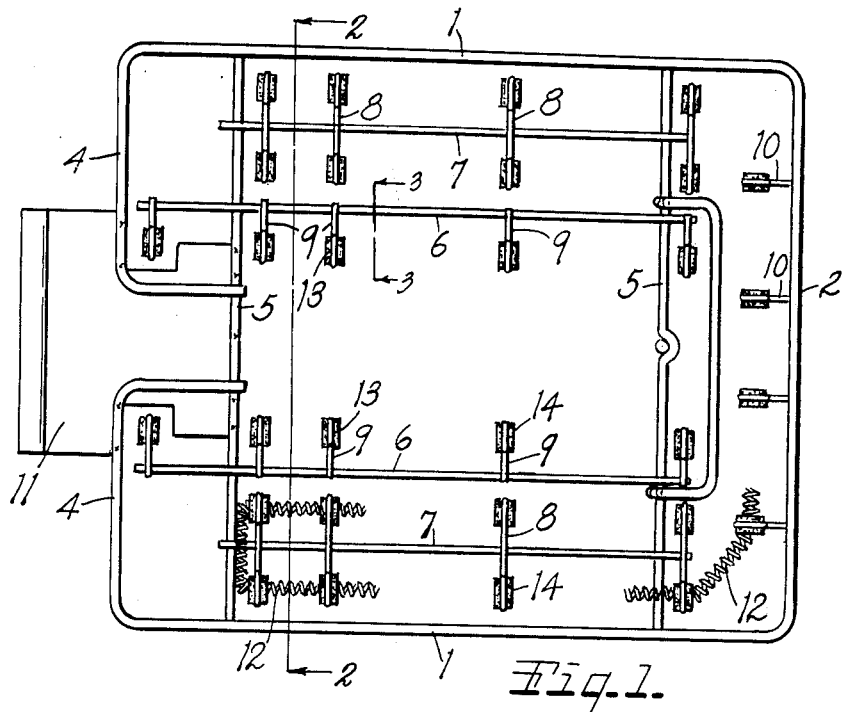
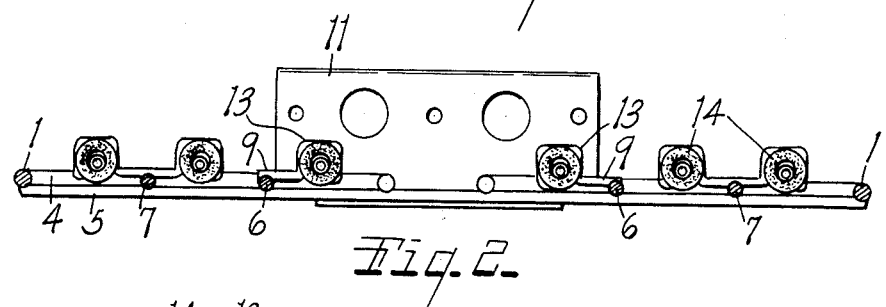
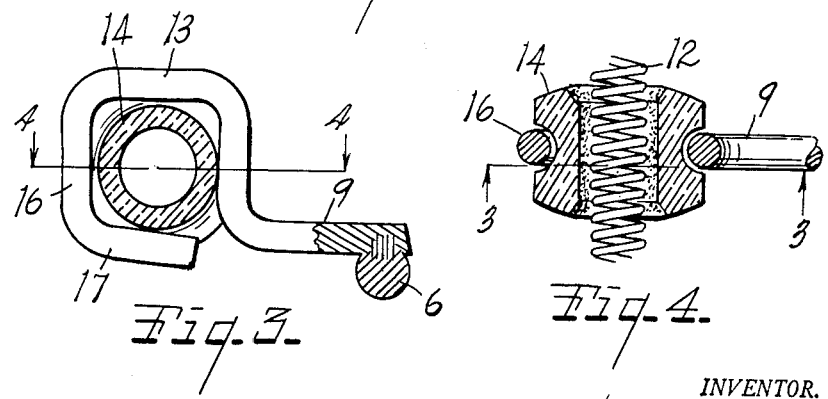
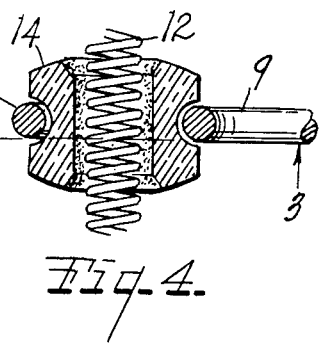
INVENTOR.
Charles A. Averill
BY Jan. 24, 1956  C. C. AVERILL  2,732,475
HEATING ELEMENT UNIT FOR OVENS AND THE LIKE
Filed Oct. 8, 1951  2 Sheets-Sheet 2
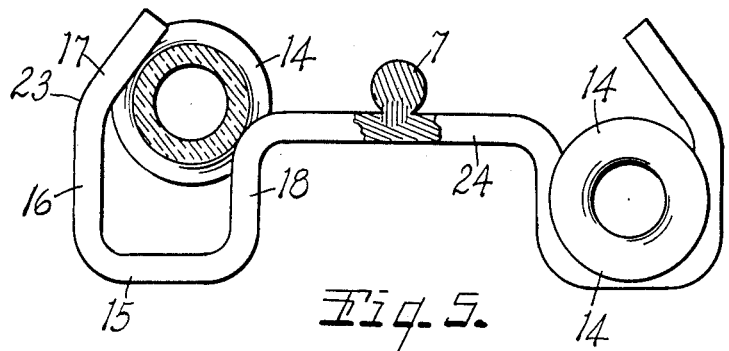
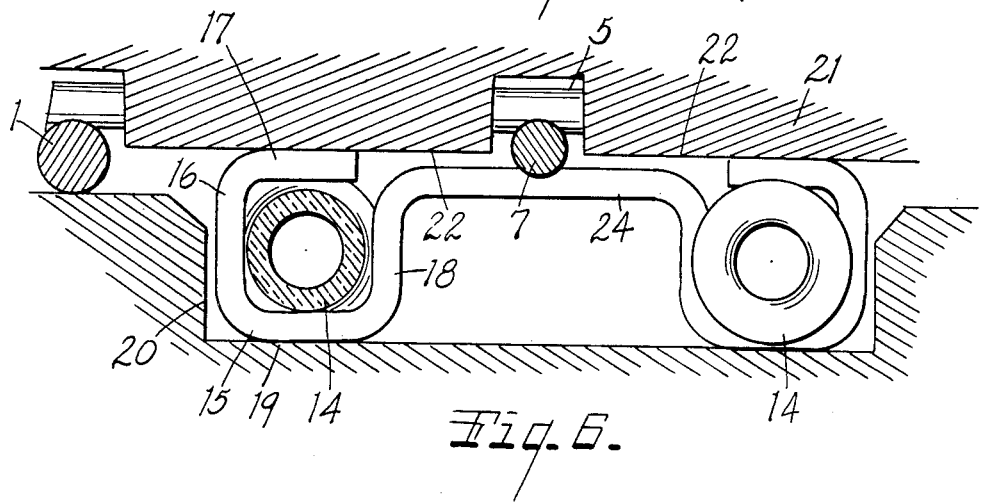
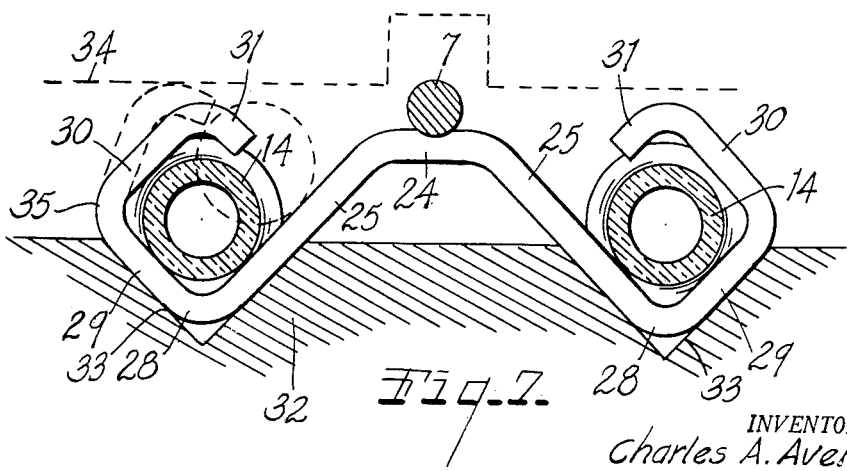
INVENTOR.
Charles A. Averill
BY
Otto A. Earl
Attorney.

United States Patent Office 2,732,475
Patented Jan. 24, 1956

2,732,475

HEATING ELEMENT UNIT FOR OVENS AND THE LIKE

Charles C. Averill, Albion, Mich., assignor to Union Steel Products Company, Albion, Mich.

Application October 8, 1951, Serial No. 250,296

8 Claims. (Cl. 219—19)

This invention relates to improvements in a heating element unit for ovens and the like.

The main objects of this invention are:

First, to provide a heating element unit for ovens and the like in which the insulators for the heating element are effectively secured in position without danger of fracturing the insulators in use, and a structure in which all of the insulators of the unit may be simultaneously secured in their clips or holders after being assembled therein.

Second, to provide a heating unit of this character which may be formed mainly of wire and which is economical in its parts and in the assembly thereof and has a relatively small mass of metal to be heated in bringing an oven, for example, to the desired temperature.

Third, to provide a heating unit of this character in which the insulators may be quickly assembled and are effectively retained during the process of assembling the unit.

Objects relating to details and economies of the invention will appear from the description to follow. The invention is pointed out in the claims.

A preferred embodiment of the invention is illustrated in the accompanying drawings, in which:

Fig. 1 is a plan view of an oven heating unit embodying the invention.

Fig. 2 is a transverse sectional view on a line corresponding to line 2—2 of Fig. 1.

Fig. 3 is an enlarged fragmentary view partially in section on a line corresponding to line 3—3 of Figs. 1 and 4.

Fig. 4 is a fragmentary view in section on a line corresponding to line 4—4 of Fig. 3.

Fig. 5 is an enlarged fragmentary view partially in section illustrating certain of the steps in assembling the heating unit.

Fig. 6 is a fragmentary view partially in section illustrating another step in the assembling of the heating unit.

Fig. 7 is a fragmentary view partially in section illustrating a modified form or embodiment of the invention and certain details of the assembling thereof, the assembled relations of the insulator in the holders therefor being shown in final position by full lines and one of them being shown in open position by dotted lines to illustrate the assembly of the insulators therewith.

In the structure illustrated in the accompanying drawing the frame comprises side members 1—1, a front member 2 connecting to the front ends of the side members, and rear members 4—4. The frame also includes the crossbars 5—5 extending between the side members.

In the embodiment illustrated, pairs of longitudinally disposed insulator supporting rods 6 and 7 are provided, these being arranged in balanced relation. The rods 7 have crossarms 8 extending transversely at both sides thereof. The rods 6 have crossarms 9 corresponding to the crossarms 8 but which extend only to one side thereof. The crossarms 10 corresponding to the crossarms 9 are secured to the front end member 2 to project inwardly therefrom. A supporting plate 11 is provided for the connector elements which are not shown as they have no relationship to the insulator mounting features of the unit other than that suitable connections are provided for the resistance element 12 which is of the coiled wire type.

The crossarms of the embodiment shown in Figs. 1 to 6, inclusive, have upwardly offset rectangular loops 13 at the ends thereof, the crossarms 8 having a loop at each end. These loops are adapted to receive the insulators 14 which have peripheral grooves 15. The outer arms 16 of the loops are provided with inwardly projecting fingers 17 which are initially disposed in an inwardly inclined position as shown in Fig. 5. It should be understood that the parts in this figure are shown in inverted position to illustrate a step in the assembling of the structure. The fingers 17 are initially spaced from the inner arms 18 of the loops to permit the insulators 14 being inserted or passed through the opening and dropped into the loops in supported relation to the bights 19 thereof and between the arms 16 and 18 as is shown in Fig. 5.

After all the insulators of the unit have been placed in the loops the unit thus assembled is placed in a press, the bed of which is indicated at 19 in Fig. 6, and which is recessed as indicated at 20 to receive the crossarms while the unit is in inverted position. The head of the press 21 is provided with jaw portions 22 positioned to engage the fingers 17 so that when the press is actuated the fingers are bent inwardly to closed insulator retaining position as shown in Fig. 6. The rectangular shape of the loops insures the bending of the finger portions 17 at the juncture point 23 for the fingers to the arms 16 of the loops. This bending of the fingers at the juncture point avoids collapsing or clamping of the loops upon the insulators with crushing or breaking force. This form of insulator support also permits the insulators being assembled merely by dropping them into the loops without any springing of the loops, and the insulators are all secured by one stroke of the press.

Another advantage is that the insulators may be dropped into the loops or clips when they are in inverted position as shown in Fig. 5 and the assembly handled as a unit for transporting from such assembling operation to the press and this also permits stacking of a quantity of the assembled units for convenient press operation thereon. In the embodiment shown in Figs. 1 to 6, inclusive, the loops or clips are upwardly offset relative to the crossarms.

It is sometimes desirable, as shown in Fig. 7, to support the insulators in a more elevated position than is shown in Figs. 1 to 6 and to that end the crossarms 24 have diverging end portions 25 terminating in loops 28, the bight portions 29 of which are downwardly inclined and the outer arms 30 of which are inwardly inclined and terminate in inturned fingers 31.

The loops or clips are initially open as shown by dotted lines in Fig. 7. The insulators are dropped into the loops or clips with the frame in an inverted position. With the insulators assembled in the frame and holders therefor, the unit is placed in a press, the bed 32 of which is provided with V-shaped recesses 33 adapted to receive and support the crossarms, and when the head of the press 34 is actuated all of the loops or clips are simultaneously closed. The loops are so supported that they bend at the juncture 35 of the arms 30 with the bight portions 29 of the loops and as the stroke of the press is regulated the arms 30 of the inturned fingers 31 are closed into the grooves and the insulators effectively retained without any crushing stress being applied thereto, and further expansion and contraction of the metal can take place without crushing or breaking the insulators. The heating element 12 is rove through the insulators in the desired sequence.

All of the insulators can be assembled without danger of their falling out as they are moved from the assembly table to the press and they may, if desired, be stacked or accumulated for the press operation. A single stroke of a standard type of punch press having a suitably modified base or bed and head is entirely satisfactory for the purpose. The insulators and the clips therefor are free to expand and contract relative to each other without fracturing the insulators. This is important as the temperature of the heating element commonly approaches 2000° F. A further advantage is that the mass of metal used is substantially a minimum which is an advantage not only from the standpoint of cost of material but also the matter of bringing the unit to the desired cooking temperature in the preheat stage as is commonly practiced in baking, for example.

A further advantage is that the supporting rods constitute guard rails for preventing the broiler pan from coming into contact with the insulators or coils and this avoids the necessity of adding guard rails as are required with some forms of heating units. In the event that an insulator may be broken by careless handling the clip or holder may be pried open and a new insulator inserted and the clip reclosed.

I have not illustrated or described various adaptations or embodiments of the invention of which it is capable as it is believed that this disclosure will enable those skilled in the art to embody or adapt the invention as may be desired.

Having thus described my invention, what I claim as new and desire to secure by Letters Patent is:

1. A heating unit comprising spaced frame members, a crossrod fixedly secured to said frame members, a plurality of crossarms of bendable wire stock fixedly secured to said rod in spaced parallel relation and having upwardly offset downwardly facing rectangular insulator-receiving loops at their ends, and peripherally grooved insulators disposed in said loops, the outer arms of the loops terminating in bendable fingers disposed in the grooves of the insulators to releasably retain the insulators within the loops, the grooves being disposed generally circularly around the insulators, the rectangular loops being radially spaced from the radially innermost portions of the grooves at the junctures of the sides of the loops.

2. A heating unit comprising a supporting rod, a plurality of crossarms of bendable wire stock fixedly secured to said rod in spaced relation and having downwardly facing rectangular insulator-receiving loops at their ends, and peripherally grooved insulators disposed in said loops, the outer arms of the loops terminating in fingers disposed in the grooves of the insulators to releasably retain the insulators within the loops, the grooves being disposed generally circularly around the insulators, the rectangular loops being radially spaced from the radially innermost portions of the grooves at the junctures of the sides of the loops.

3. A heating unit comprising a supporting rod, a plurality of crossarms of bendable wire stock fixedly secured to said rod in spaced relation and having rectangular insulator-receiving loops at their ends, and peripherally grooved insulators disposed in said loops, the outer arms of the loops being bendable and bendably engaged in the grooves of the insulators to retain the insulators within the loops, the rectangular loops at the corners thereof being radially spaced from the radially innermost portions of the grooves.

4. A heating unit comprising a supporting rod, a plurality of crossarms of bendable wire stock fixedly secured to said rod in spaced relation and having rectangular insulator-receiving loops at their ends, and peripherally grooved insulators disposed in said loops, the outer arms of the loops being angled, their ends being disposed in the grooves of the insulators to retain the insulators within the loops, said outer arms at the angles thereof being radially spaced from the radially innermost portions of the grooves.

5. The method of assembling heating element holder units comprising the steps of fixedly securing a plurality of crossarms of bendable wire stock in parallel spaced relation to a rod-like support element, said crossarms having offset polygonal insulator receiving loops at their ends, the outer arms of the loops terminating in inwardly inclined bendable fingers spaced from the inner arms of the loops to a degree permitting the insertion of grooved insulators into the loops, the crossarms being positioned on the support element with the loops of the crossarms correspondingly arranged relative to the supporting element and with the loops of each crossarm disposed in substantially the same plane, positioning such assembled parts with the loops opening upwardly, inserting peripherally grooved insulators into the loops, and with the insulators assembled in the loops supporting the loops on the outer sides of the outer arms to limit outward spreading thereof and supporting the loops on the outer sides of the portions thereof connecting the outer arms to the inner arms, and while the loops are so supported simultaneously subjecting the bendable fingers of the loops to bending stress and bending them into the grooves of the insulators and thereby retaining the insulators within the loops.

6. The method of assembling heating element holder units comprising the steps of fixedly securing a plurality of crossarms of bendable wire stock in spaced relation to a rod-like support element, said crossarms having offset polygonal insulator receiving loops at their ends, the outer arms having inwardly inclined bendable portions spaced from the inner arms of the loops to a degree permitting the insertion of grooved insulators into the loops, the crossarms being positioned on the support element with the loops of the crossarms correspondingly disposed relative to the support element, positioning such assembled parts with the loops opening upwardly, inserting peripherally grooved insulators into the loops, and with the insulators assembled in the loops supporting the loops on the outer sides of the outer arms to limit outward spreading thereof and supporting the loops on the outer sides of the portions thereof connecting the outer arms to the inner arms, and while the loops are so supported simultaneously subjecting said inwardly inclined bendable portions of the loops to bending stress and swinging them into the grooves of the insulators and thereby retaining the insulators within the loops.

7. A heating unit comprising a supporting rod, a plurality of crossarms of bendable wire stock fixedly secured to said rod in transversely extending relation to the rod and in spaced relation to each other, polygonal loops having a plurality of angularly connected straight sides formed in the ends of said arms and disposed in parallel planes extending transversely of the rod, the loops terminating in bendable arms and peripherally grooved insulators disposed in said loops with the sides of the loops in retaining engagement around said insulators and extending into the grooves thereof, the arms of each loop being bent into closely spaced relation with the central secured portion of the arms to prevent removal of the insulators radially from the loops.

8. A heating unit comprising a supporting rod, a plurality of crossarms of bendable wire stock fixedly secured to said rod in transversely extending relation to the rod and in spaced relation to each other, polygonal loops having a plurality of angularly connected straight sides formed in the ends of said arms and disposed in parallel planes extending transversely of the rod, the loops terminating in bendable arms and insulators disposed in said loops with the sides of the loops in retaining engagement around said insulators, the insulators having axially spaced projecting surfaces on each side of said loops disposed around the periphery thereof, the arms of each loop being bent into closely spaced relation with the central portion of the arms to prevent removal of the insulators radially from the loops.

(References on following page)

References Cited in the file of this patent

UNITED STATES PATENTS

| | | |
|---|---|---|
| 907,834 | Marshall | Dec. 29, 1908 |
| 1,154,416 | Kuhn | Sept. 21, 1915 |
| 1,480,084 | Lamb | Jan. 8, 1924 |
| 1,563,453 | Sutherland | Dec. 1, 1925 |
| 2,102,302 | Arnold | Dec. 14, 1937 |
| 2,226,781 | Rutenber | Dec. 31, 1940 |
| 2,237,094 | Aske | Apr. 1, 1941 |
| 2,316,222 | Butters | Apr. 13, 1943 |
| 2,438,419 | Schmidt | Mar. 23, 1948 |
| 2,478,808 | Deal | Aug. 9, 1949 |
| 2,478,809 | Deal | Aug. 9, 1949 |
| 2,567,547 | Bussing | Sept. 11, 1951 |
| 2,612,540 | Ridgers et al. | Sept. 30, 1952 |
| 2,680,799 | Ames | June 8, 1954 |

FOREIGN PATENTS

| | | |
|---|---|---|
| 9,478 | Great Britain | May 11, 1893 |
| 430,586 | Great Britain | June 21, 1935 |